United States Patent [19]

Köhler et al.

[11] 4,154,490
[45] May 15, 1979

[54] SEALED BUSHINGS FOR UNIVERSAL JOINTS

[75] Inventors: Hans-Joachim Köhler, Herzogenaurach; Guido Rieder, Wilhelmsdorf, both of Fed. Rep. of Germany

[73] Assignee: Industriewerk Schaeffler OHG, Herzogenaurach, Fed. Rep. of Germany

[21] Appl. No.: 886,522

[22] Filed: Mar. 14, 1978

[30] Foreign Application Priority Data

Apr. 26, 1977 [DE] Fed. Rep. of Germany ........ 2718503

[51] Int. Cl.² .................................................. F16D 3/84
[52] U.S. Cl. .................................. 308/187.2; 64/17 A
[58] Field of Search ............. 64/17 A, 17 R; 308/187, 308/187.1, 187.2; 277/94–95

[56] References Cited
U.S. PATENT DOCUMENTS

| 2,896,432 | 7/1959 | Hempel | 64/17 A |
| 2,996,901 | 8/1961 | Kleinschmidt | 64/17 A |
| 4,021,085 | 5/1977 | Willyard | 308/187.2 |

FOREIGN PATENT DOCUMENTS 739656 11/1955 United Kingdom .................. 64/17 A Primary Examiner—Douglas C. Butler
Attorney, Agent, or Firm—Hammond & Littell

[57] ABSTRACT

A sealed bushing for a universal joint comprising a bushing with one closed end and an open end for accommodating a universal joint trunnion, rolling elements mounted in the bushing and an elastic sealing ring mounted in the open end of the bushing adapted to closely surround the trunnion and to cooperate with a shoulder of the trunnion to form a seal for the bearing, an axially through going air vent slot being provided between the sealing ring and the trunnion, the outermost end of the slot being sealed from external influences by an elastic sealing lip which preferably interacts with the trunnion shoulder.

3 Claims, 1 Drawing Figure

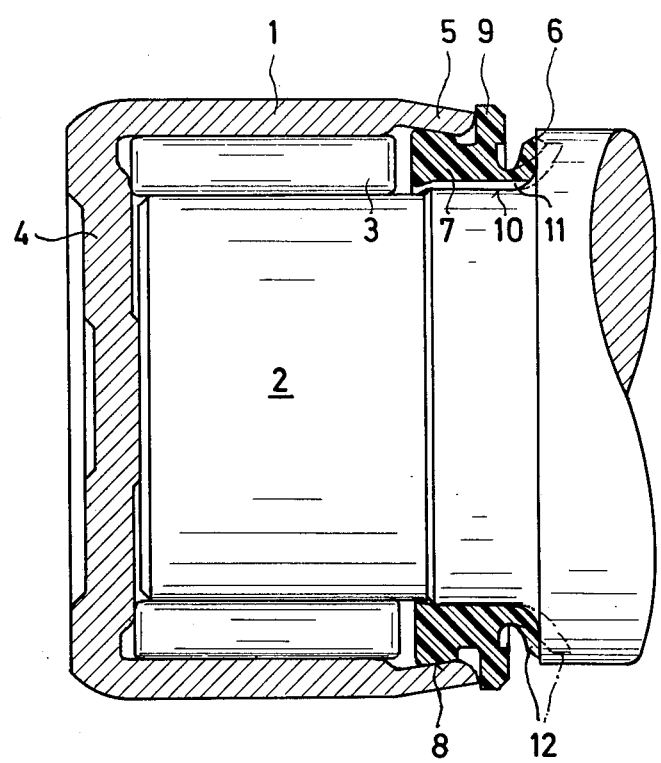

SEALED BUSHINGS FOR UNIVERSAL JOINTS

STATE OF THE ART

During assembly of universal joints, the sealing ring can be either firmly mounted onto the spider trunnion or can surround the trunnion with so little play that there effectively with a slight play between the sealing ring and the trunnion. However, to avoid any trouble in assembling the universal joint, there has to be a provision for compressed air and/or excess lubricant to escape from the bushint to avoid the danger of pushing the sealing ring out of the mounting at the bushing end.

To accomplish this, an air vent slot is provided on the side of the sealing ring facing the shoulder of the trunnion, but due to tolerance reasons, it can not be insured that the face of the sealing ring is under all operating conditions tightly sealed against the trunnion shoulder. Therefore, it is possible during operation that lubricant can exit from the bearing and/or dirt or moisture can penetrate the bushing resulting in a premature destruction of the bearing.

OBJECTS OF THE INVENTION

It is an object of the invention to provide a sealed bushing for a universal joint which can be easily assembled while ensuring a safe seal.

This and other objects and advantages of the invention will become obvious from the following detailed description.

THE INVENTION

The sealed bushing of the invention for a universal joint is comprised of a bushing with one closed end and an open end for accommodating a universal joint trunnion, rolling elements mounted in said bushing and an elastic sealing ring mounted in said open end of the bushing adapted to closely surround the trunnion and to cooperate with a shoulder of the trunnion to form a seal for the bearing, an axially through going air vent slot being provided between the sealing ring and the trunnion, the outer most end of the said slot being sealed from external influences by an elastic sealing lip.

In a preferred embodiment of the invention, the elastic sealing lip is integral with the sealing ring at the tip thereof and is in the form of a circumferential collar which has the advantage that the sealing lip is in constant with the trunnion despite any tolerances occurring to insure a perfect seal. In a preferred embodiment, the free end of the sealing lip is substantially radially outwardly turned whereby under external influences such as water jets in a car wash, the sealing lip is pressed against the trunnion to prevent any water from penetrating into the bearing. On the other hand, the sealing lip will lift off the trunnion under pressure effects produced in the bushing during relubrication to allow air and/or excess lubricant to escape.

Referring to the drawing:

The single FIGURE is a cross-sectional view of one embodiment of the invention of a universal joint sealed bushing.

In the universal joint of the FIG. a trunnion 2 is rotatably mounted through cylindrical rollers 3 in the bushing 1 of the universal joint which is closed at one end with a bottom 4 and is provided at the opposite end with an offset, radially inwardly inclined collar 5. Between the collar 5 and shoulder 6 of trunnion 2, there is arranged a sealing ring 7 which forms an assembled unit with bushing 1. The sealing ring 7 interacts with the inner peripheral area 8 of collar 5 to form a seal and flange 9 of sealing ring 7 fixes the ring in an axial direction.

The sealing ring 7 together with inner peripheral area 10 of trunnion 2 form an air vent slot 11 which is sealed from external influences by elastic sealing lip 12 which is integrally formed with sealing ring 7 and has a radially outwardly directed contact with shoulder 6 of trunnion 2.

In its non-assembled state, the bearing bushing 1 together with rollers 3 and sealing ring 7 form an assembled unit with sealing lip 12 having the dash-dot position before mounting. When the said pre-assembled unit is pressed onto trunnion 2, air compressed in the bushing 1 or excess lubricant can exit therefrom by air vent slot 11. This prevents any adverse effects on sealing ring 7 which could impair its position. The sealing lip 12 during assembly initially contacts shoulder 6 of trunnion 2 with its outer peripheral face and then assumes a final position as indicated by the solid lines of the FIG. to form a seal with shoulder 6.

Various modifications of the sealed bushing of the universal joint of the invention may be made without departing from the spirit or scope thereof and it should be understood that the invention is to be limited only as defined in the appended claims.

We claim:

1. A bearing bushing for a universal joint comprising a bushing with one closed end and an open end for accommodating a universal joint trunnion, rolling elements mounted in said bushing and an elastic sealing ring mounted in said open end of the bushing adapted to closely surround the trunnion and to cooperate with a shoulder of the trunnion to form a seal for the bearing, an axially through going air vent slot being provided between the sealing ring and the trunnion, the outer most end of the said slot being sealed from external influences by an elastic sealing lip.

2. The bushing of claim 1 wherein the sealing lip is integral with the sealing ring and is formed as a circumferential collar.

3. The bushing of claim 1 wherein the sealing lip is provided with a substantially radially-outwardly turned free end.

* * * * *